US007340262B1

(12) United States Patent
Gillespie et al.

(10) Patent No.: US 7,340,262 B1
(45) Date of Patent: Mar. 4, 2008

(54) METHOD AND SYSTEM FOR PROVIDING LOCATION-SENSITIVE CALL MANAGEMENT SERVICES TO A MOBILE SUBSCRIBER

(75) Inventors: Donald E. Gillespie, Boulder, CO (US); Jafar Nabkel, Boulder, CO (US); Harvey J. Benson, Highlands Ranch, CO (US); Karen Siegel-Jacobs, Boulder, CO (US); Edward A. Youngs, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/444,359

(22) Filed: Nov. 18, 1999

(51) Int. Cl.
*H04Q 7/20* (2006.01)

(52) U.S. Cl. ............................. 455/456.3; 455/432.3

(58) Field of Classification Search ............... 455/456, 455/421, 414, 422, 432, 517, 457, 441, 436, 455/437, 440, 448, 417, 456.1, 456.2, 456.3, 455/418, 414.1, 414.2, 414.3, 432.3
See application file for complete search history.

(56) References Cited

U.S. PATENT DOCUMENTS

| | | | |
|---|---|---|---|
| 6,011,973 A * | 1/2000 | Valentine et al. ........ 455/456.6 |
| 6,049,711 A * | 4/2000 | Ben-Yehezkel et al. .. 455/414.3 |
| 6,094,576 A * | 7/2000 | Hakkinen et al. ......... 455/422.1 |
| 6,208,857 B1 * | 3/2001 | Agre et al. .................. 455/428 |
| 6,212,377 B1 * | 4/2001 | Dufour et al. ........... 455/426.2 |
| 6,212,390 B1 * | 4/2001 | Rune ....................... 455/456.6 |
| 6,230,017 B1 * | 5/2001 | Andersson et al. ...... 455/456.6 |
| 6,233,448 B1 * | 5/2001 | Alperovich et al. ........ 455/417 |
| 6,324,404 B1 * | 11/2001 | Dennison et al. ......... 455/456.1 |
| 6,347,227 B1 * | 2/2002 | Johansson ................ 455/456.1 |
| 6,389,288 B1 * | 5/2002 | Kuwahara et al. ....... 455/456.6 |
| 6,397,040 B1 * | 5/2002 | Titmuss et al. .......... 455/67.11 |
| 6,522,888 B1 * | 2/2003 | Garceran et al. ........... 455/456 |
| 6,577,857 B1 * | 6/2003 | Rodriguez .................. 455/405 |
| 6,618,594 B1 * | 9/2003 | Myers et al. ................ 455/457 |
| 6,629,136 B1 * | 9/2003 | Naidoo ....................... 709/219 |

* cited by examiner

*Primary Examiner*—Tu Nguyen
(74) *Attorney, Agent, or Firm*—Townsend and Townsend and Crew LLP

(57) ABSTRACT

A method and system for processing communication services for a mobile subscriber associated with a wireless network includes a database for storing location-dependent rules associated with at least one communication service subscribed to by the mobile subscriber. Service logic then determines a current location of the mobile subscriber and generates call processing instructions for processing the communication services based on the location-dependent rules and the current location of the mobile subscriber.

31 Claims, 2 Drawing Sheets

2

METHOD AND SYSTEM FOR PROVIDING LOCATION-SENSITIVE CALL MANAGEMENT SERVICES TO A MOBILE SUBSCRIBER

TECHNICAL FIELD

This invention relates to methods and systems for providing location-sensitive call management services to a mobile subscriber.

BACKGROUND ART

With the emerging wireless networks and increased participation in wireless communications, new features are continually developed and made available to mobile phone subscribers. For example, one-number services allow subscribers to be reached wherever they physically are as long as they are in the vicinity of either their wireline telephone or their mobile phone. This feature allows the mobile phone to be used for both personal and work purposes. However, this continuous, or uninterrupted, communications may result in excessive calls to some subscribers thereby encroaching on their personal or work life.

It would be desirable, however, to manage calls to a mobile subscriber based on their current geographic location. For example, it may be desirable to prohibit preselected originating calls to a mobile phone when the subscriber is at, or near, their residence.

SUMMARY OF THE INVENTION

It is a general object of the present invention to provide location-sensitive call management services to a mobile subscriber.

In carrying out the above object and other objects, features, and advantages of the present invention, a method is provided for processing communication services for a mobile subscriber associated with a wireless network. The method includes defining location-dependent rules associated with at least one communication service subscribed to by the mobile subscriber, determining a current location of the mobile subscriber, and processing the communication services based on the location-dependent rules and the location of the mobile subscriber.

In further carrying out the above object and other objects, features, and advantages of the present invention, a system is also provided for carrying out the steps of the above described method. The system includes a database for storing location-dependent rules associated with at least one communication service subscribed to by the mobile subscriber. The system further includes service logic in communication with the database for determining the current location of the subscriber and generating call processing instructions based on the location-dependent rules and the current location of the mobile subscriber.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
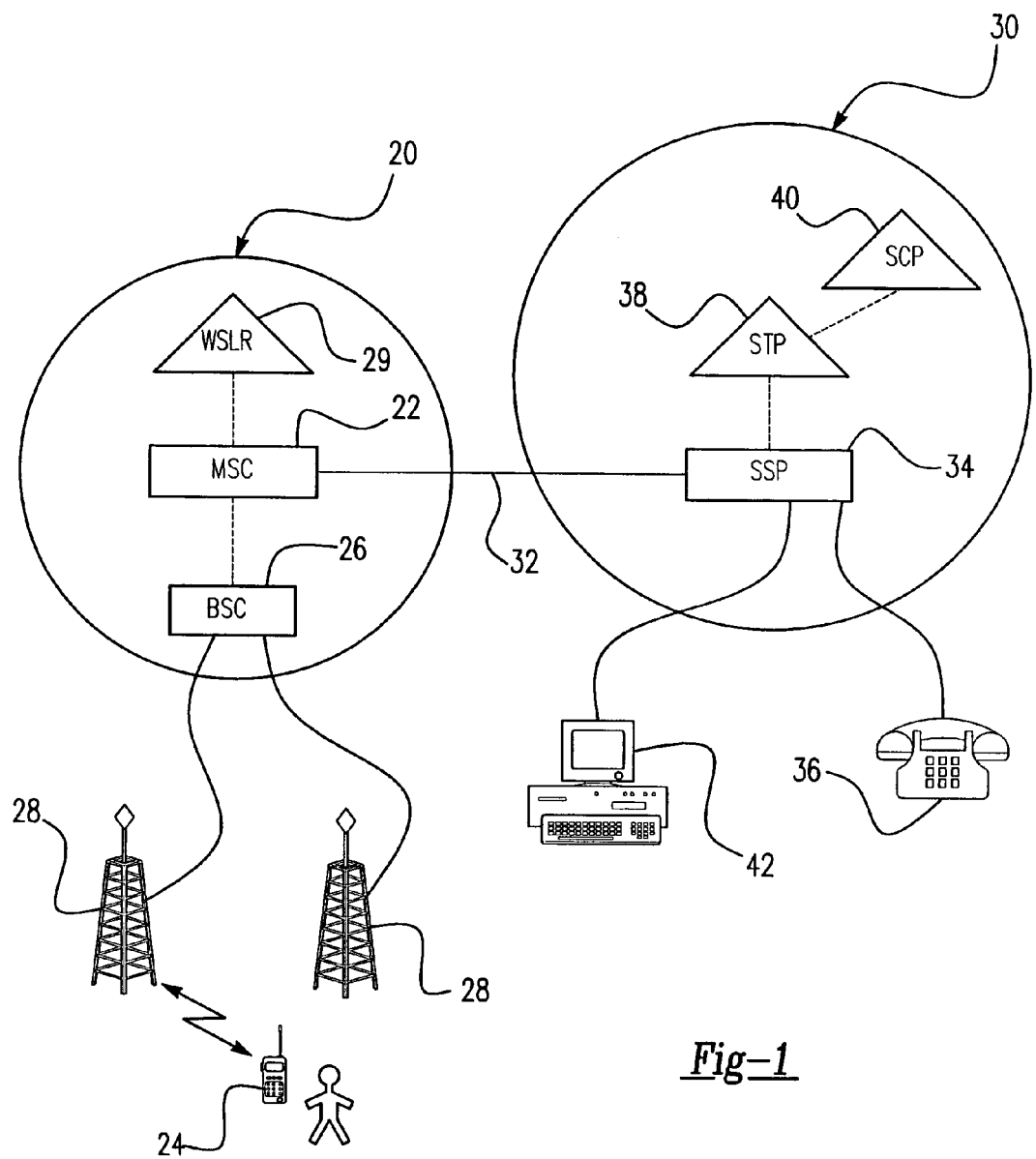
FIG. 1 is a schematic diagram of an interactive wireline and wireless network system architecture incorporating the teachings of the present invention.

A schematic diagram of the system architecture of an interactive wireline and wireless network incorporating the teachings of the present invention is shown in FIG. 1. The wireless network 20 typically includes a Mobile Switching Center (MSC) 22 for processing calls to and from the wireless users of the wireless network 20. MSC 22 is known to those skilled in the art as a digital telephone exchange that controls the switching between a wireline network 30 and mobile cell sites for all wireline-to-mobile, mobile-to-wireline, and mobile-to-mobile calls. In operation, when MSC 22 receives a call from the wireline network 30 that is directed to a wireless handset 24, MSC 22 deciphers the telephone number dialed by the originating caller and alerts Base Station Controllers (BSCs) 26 (described below) at one or more cell sites to page the corresponding wireless handset 24. Similarly, when wireless handset 24 places a call, MSC 22 accepts the dialing data from BSC 26 and uses the desired number for routing the communication. MSC 22 also processes mobile registration status data received from BSC 26, switches calls to other cells, processes diagnostic information, and compiles mobile billing information.

Typical wireless networks include several coverage areas each including multiple adjoining cells. The BSC 26, which operates under the direction of MSC 22, serves each coverage area via a plurality of Base Stations (BSs) 28 disposed throughout each of the adjoining cells. The BSC 26 manages each of the radio channels assigned to its coverage area, supervises calls, turns the radio transceivers on and off, injects data onto control and user channels, and performs diagnostic tests on the cell site equipment. The BSs 28 communicate with the BSC 26 utilizing a base station protocol such as IS-634.

To register a subscriber in the wireless network 20, MSC 22 ascertains whether a subscriber is present in the wireless network when the subscriber places a call via the wireless handset 24, receives a call via the wireless handset 24, or by automatic registration. Specifically, each time wireless handset 24 is powered on or a call is originated from wireless handset 24, certain information is transmitted to MSC 22, including a Mobile Identification Number (MIN), an Electronic Serial Number (ESN), and a System Identification (SID) of the wireless handset 24. In order to respond to subscriber call requests, the MSC 22 compares the information transmitted by the wireless handset 24 with subscriber data contained in a database, referred to as a Wireless Service Location Register (WSLR) 29. The WSLR 29 is a master database for storing data related to each mobile subscriber, such as the subscriber profile and mobility information together with their relevant permanent (static) data, such as access capabilities and subscriber services. WSLR 29 also contains location and service data for each visiting subscriber entering its coverage area in order to route incoming and outgoing calls appropriately. The WSLR 29 performs substantially the same functionality as the well known Home Location Register and Wireless Service Control Point, yet serves one or more MSCs 22 rather than only one MSC 22, as traditionally done in the prior art.

MSC 22 and WSLR 29 communicate with each other utilizing a signaling protocol, such as IS-41 Mobile Application Part (MAP) or GSM MAP. In some implementations, MSC 22 and WSLR 29 may be integrated into one component.

The MSC 22 of the wireless network 20 is typically connected to an equivalent wireline switch 34 in the wireline network 30 via trunk circuits 32. The wireline switch 34 is typically a Service Switching Point (SSP), as will be described in greater detail below. The wireline network 30 typically consists of a number of switches and application processors interconnected by transmission circuits to serve a plurality of wireline telephones 36. Common Channel Signaling, such as Signaling System No. 7 (SS7), is a signaling method in which a signaling channel conveys, by means of labeled messages, signaling information relating to call setup, control, network management, and network maintenance. The SS7 network exists within the wireline network 30 and controls it accordingly. SS7 achieves this control by creating and transferring call processing, network management and maintenance messages to the network's various components.

An SS7 network has three distinct components, SSPs 34, Signal Transfer Points (STPs) 38, and Service Control Points (SCPs) 40. SSP 34 performs call processing on calls that originate, tandem, or terminate at that site. As part of this call processing, SSP 34 may generate SS7 messages to transfer call-related information to other SSPs, or to send a query to SCP 40 for instructions on how to route a call.

STP 38 is a switch that relays messages between network switches and databases. The main function of STP 38 is to route SS7 messages to the correct outgoing signaling link based on information contained in the SS7 message address fields. SCP 40 contains centralized network databases for providing enhanced services. The SCP 40 accepts queries from an SSP 34 and returns the requested information to the originator of the query.

Figure 2:
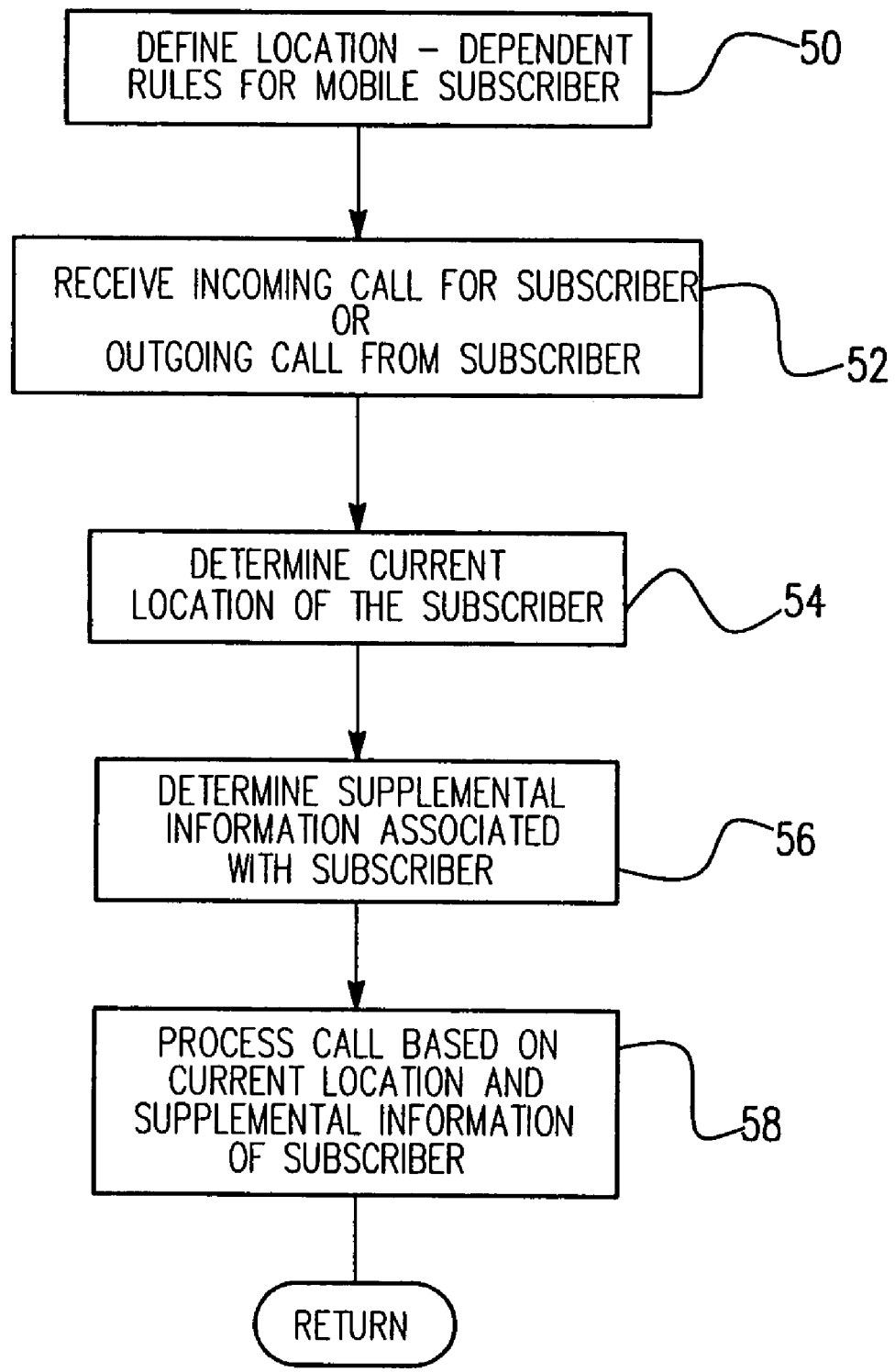
FIG. 2 is a flow diagram illustrating the general sequence of steps associated with the method of the present invention.

Turning now to FIG. 2, there is shown a flow diagram illustrating the general sequence of steps associated with the method of the present invention. The method includes the initial step of defining and storing location-dependent rules for a mobile subscriber, as shown at block 50, which are preferably stored in WSLR 29. First, the subscriber defines one or more geographic regions in which the location-dependent rules will apply. This can be accomplished in a number of ways. For example, the subscriber may define an area that changes as the subscriber's location changes. That is, the subscriber may select a geographic region defining a one-kilometer radius circle from the subscriber's current location. This type of dynamic geographic region can be identified by having the subscriber press a predetermined key on the handset 24.

Alternatively, the subscriber may define a static geographic region that is independent of the subscriber's location by specifying a radius from a specific point, a latitude/longitude grid, a specific ZIP code, or a census tract. This selection can be accomplished manually by entering a predetermined ZIP code or by using a map over a Web-based Geographic Informations Systems (GIS). Also, the subscriber can also define the region by pressing a key on the handset to identify a radius from the subscriber's current location that remains static, regardless of the position of the subscriber.

Then, the subscriber selects the type of call processing he desires while in each of these regions. For example, when a subscriber is in his/her residential area, the subscriber may want a Do Not Disturb service wherein an announcement is played to all or preselected calling parties stating that the subscriber is unavailable to receive calls at the moment. Or, a subscriber may want his caller identification service to replace his handset's caller identification with the subscriber's office telephone number when the handset is in the vicinity of the subscriber's office location.

Next, an incoming call is placed to the subscriber or an outgoing call is originated from the subscriber, as shown at block 52, thereby initiating the location-dependent call processing management of the present invention. When incoming calls are placed to the subscriber's handset 24, a signal (e.g., Location Request) is sent from the MSC 22 to the WSLR 29 requesting instructions on how to process the call. Alternatively, when outgoing calls are placed from the subscriber's handset 24, a signal (e.g., Origination Request) is sent from the MSC 22 to the WSLR 29 requesting instructions on how to process the call.

In order to generate the appropriate call processing instructions for MSC 22, WSLR 29 must determine the current location of the subscriber, or handset 24, as shown at block 54. The location of the handset 24 can be either: 1) continuously furnished to the WSLR 29 from either the network or from the handset 24; or 2) provided to the WSLR 29 upon request. The location of the handset 24 can be determined from a variety of techniques including determining a time-offset or signal strength from the handset 24 and performing triangulation of radio signals by the BSs 28 or by using Global Positioning Systems (GPS) receivers (not shown) located in the wireless handsets 24.

An additional feature may be provided in the present invention in which supplemental subscriber information is used to process the call, as shown at block 56. Supplemental subscriber information may include time-of-day or subscriber handset state. Additional information may be application-specific. For example, a package delivery/pick-up service may automatically route incoming calls to the vehicle closest to the calling party. In this example, a vehicle may be in the correct geographic region, yet be unavailable to deliver or pick-up a package because the vehicle is currently at capacity. In this example, a third-party service provider 42, FIG. 1, such as FedEx or UPS, could provide supplemental subscriber information to the location-based call management service through the wireline and wireless networks to the subscriber 24.

After determining the location and supplemental information of the subscriber and determining if there are any call processing rules applicable to the location of the subscriber, the call is processed accordingly, as shown at block 58. An example of an incoming call service is where a Do Not Disturb announcement is played when a business subscriber is in the vicinity of his/her home. An example of an outgoing call service is where the subscriber's office telephone number is substituted for the mobile identification number in caller identification services when the subscriber is in the vicinity of his/her office.

While the best modes for carrying out the invention have been described in detail, those familiar with the art to which this invention relates will recognize various alternative designs and embodiments for practicing the invention. For example, the service logic for generating the call processing instructions could be hosted in other locations than the WSLR 29, including, but not limited to, the MSC 22, the SSP 34, the STP 38, the SCP 40 and the third party customer premise equipment 42. Furthermore, various architectures for constructing the wireless network may be possible. In some situations, the functionality of the MSC may be combined with a wireline network switch. In others, the intelligence for routing wireless calls may be distributed to BSCs or other wireless network elements thereby eliminating the MSC as a discrete element. The teachings of this invention may be practiced with these and other embodiments as defined by the following claims.

What is claimed is:

1. A method for processing telephone calls for a mobile subscriber associated with a wireless network, the method comprising:
    at the wireless network, receiving from the mobile subscriber user-defined, location-dependent rules associated with at least one telephone service subscribed to by the mobile subscriber, wherein each rule received from the mobile subscriber at the wireless network includes a specification for at least one geographic area associated with the mobile subscriber and rules for processing the at least one telephone service for the mobile subscriber when the mobile subscriber is in one of the geographic areas;
    determining a current location of the mobile subscriber; and
    processing a telephone call based on the user-defined, location-dependent rules and the current location of the mobile subscriber;
    wherein the specification defines a geographic region having a predetermined radius from a current location of the subscriber that changes dynamically as the current location changes.

2. The method as recited in claim 1 wherein the wireless network includes at least one base station at a known location for communicating with the mobile subscriber and wherein determining the current location of the mobile subscriber comprises:
    receiving a signal from the mobile subscriber; and
    determining the location of the mobile subscriber based on the signal from the mobile subscriber and the known location of the at least one base station.

3. The method as recited in claim 2 wherein receiving the signal includes continuously receiving the signal from the wireless subscriber.

4. The method as recited in claim 2 wherein receiving the signal includes receiving the signal from the wireless subscriber in response to a prompt from the wireless network.

5. The method as recited in claim 2 wherein receiving the signal includes receiving a Global Positioning Signal from the mobile subscriber.

6. The method as recited in claim 2 wherein receiving the signal includes receiving a strength of the signal from the mobile subscriber.

7. The method as recited in claim 2 wherein receiving the signal includes receiving signal propagation timing information from the mobile subscriber.

8. The method as recited in claim 1 wherein processing a telephone call comprises:
    receiving an outgoing call from the mobile subscriber; and
    processing the outgoing call based on the user-defined, location-dependent rules and the current location of the subscriber.

9. The method as recited in claim 1 wherein processing a telephone call comprises:
    receiving an incoming call for receipt by the mobile subscriber; and
    processing the incoming call based on the user-defined, location-dependent rules and the current location of the subscriber.

10. The method as recited in claim 1 further comprising:
    determining supplemental subscriber information from the mobile subscriber; and
    wherein processing a telephone call further comprises processing the telephone call based on the supplemental subscriber information, the current location of the subscriber and the user-defined, location-dependent rules.

11. The method as recited in claim 1, wherein the current location of the mobile subscriber includes an area not defined by the boundaries of a cell of the wireless network.

12. The method as recited in claim 1, wherein the at least one telephone service includes caller identification.

13. The method as recited in claim 1, wherein the at least one telephone service includes call forwarding.

14. The method as recited in claim 1, wherein the at least one telephone service includes do not disturb.

15. The method as recited in claim 1 wherein at least one geographic area is not defined by the boundaries of a cell of the wireless network.

16. A system for processing telephone services for a mobile subscriber associated with a wireless network, the system comprising:
    a database for storing user-defined, location-dependent rules associated with at least one telephone service subscribed to by the mobile subscriber, wherein each rule includes a specification for at least one geographic area associated with the mobile subscriber and rules for processing the telephone services for the mobile subscriber when the mobile subscriber is in one of the geographic areas; and
    service logic for determining a current location of the mobile subscriber and generating call processing instructions for processing telephone calls based on the user-defined, location-dependent rules and the current location of the mobile subscriber;
    wherein the specification includes a geographic region having a predetermined radius from a current location of the subscriber that changes dynamically as the current location changes.

17. The system as recited in claim 16 wherein the interface is further operative to receive a signal as part of the specification that defines a changing geographic area dependent on the current location of the subscriber.

18. The system as recited in claim 16 wherein the wireless network includes at least one base station at a known location for communicating with the mobile subscriber and wherein the service logic, in determining the current location of the mobile subscriber, is further operative to receive a signal from the mobile subscriber, and determine the location of the mobile subscriber based on the signal from the mobile subscriber and the known location of the at least one base station.

19. The system as recited in claim 18 wherein the service logic, in receiving the signal, is further operative to continuously receive the signal from the mobile subscriber.

20. The system as recited in claim 18 wherein the service logic, in receiving the signal, is further operative to receive the signal from the mobile subscriber in response to a prompt by the service logic.

21. The system as recited in claim 18 wherein the service logic, in receiving the signal, is further operative to receive a Global Positioning Signal from the mobile subscriber.

22. The system as recited in claim 18 wherein the service logic, in receiving the signal, is further operative to receive a strength of the signal from the mobile subscriber.

23. The system as recited in claim 18 wherein the service logic, in receiving the signal, is further operative to receive signal propagation timing information from the mobile subscriber.

24. The system as recited in claim 16 wherein the service logic, in processing telephone calls, is further operative to receive an outgoing call from the mobile subscriber, and process the outgoing call based on the user-defined, location-dependent rules and the current location of the subscriber.

25. The system as recited in claim 16 wherein the service logic, in processing telephone calls, is further operative to receive an incoming call for receipt by the mobile subscriber, and process the incoming call based on the user-defined, location-dependent rules and the current location of the subscriber.

26. The system as recited in claim 16 wherein the service logic is further operative to determine supplemental subscriber information from the mobile subscriber and process telephone calls based on the supplemental subscriber information, the current location of the subscriber and the user-defined, location-dependent rules.

27. The system as recited in claim 16, wherein the current location of the mobile subscriber includes an area not defined by the boundaries of a cell of the wireless network.

28. The system as recited in claim 16, wherein the at least one telephone service includes caller identification.

29. The system as recited in claim 16, wherein the at least one telephone service includes call forwarding.

30. The system as recited in claim 16, wherein the at least one telephone service includes do not disturb.

31. The system as recited in claim 16, wherein at least one geographic area is not defined by the boundaries of a cell of the wireless network.

* * * * *